Figure 1:
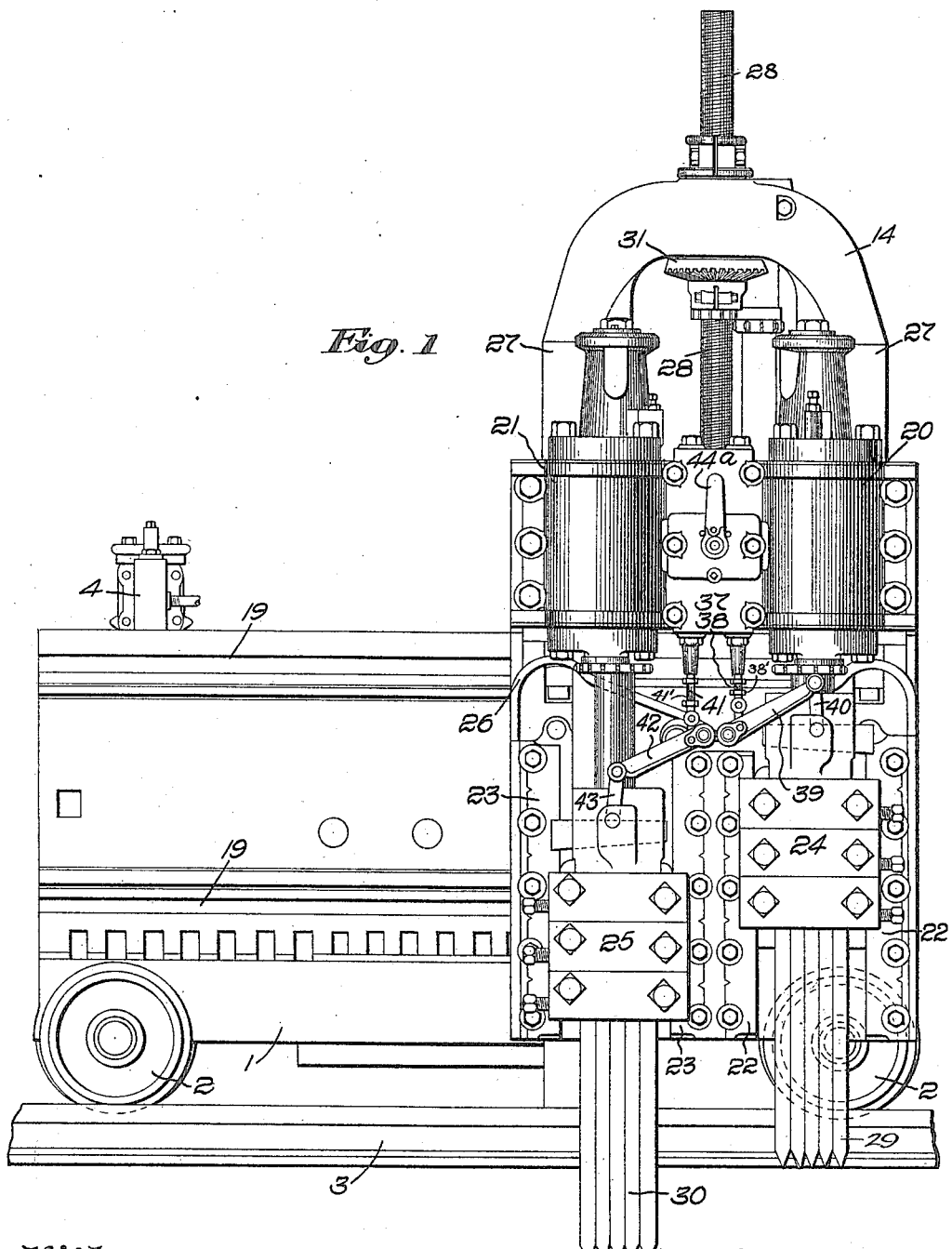

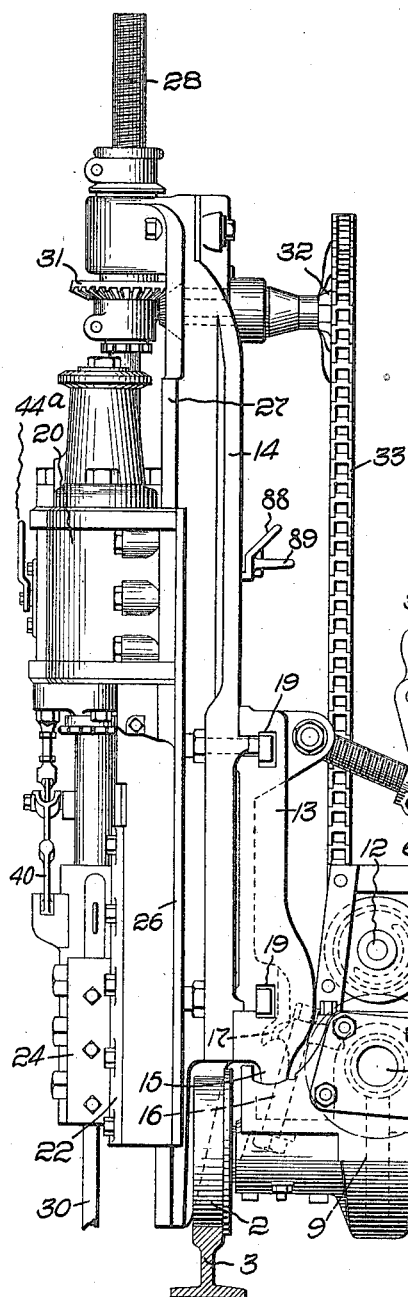
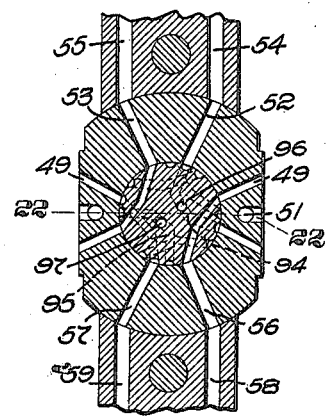
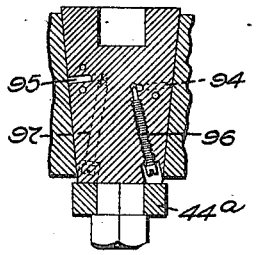

H. H. MERCER.
ENGINE.
APPLICATION FILED JUNE 22, 1910.

1,188,142.

Patented June 20, 1916.
6 SHEETS—SHEET 3.

Witnesses:
Carl L. Choate
Horace A. Crossman

Inventor:
Henry H. Mercer
by Mery Booth Janney & Varney
Attys

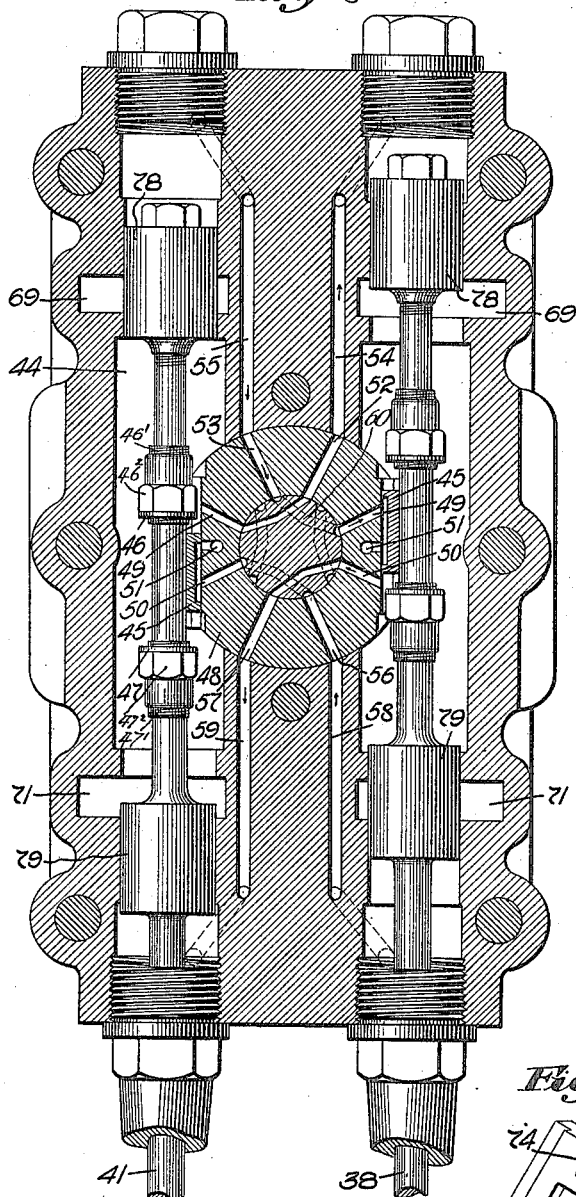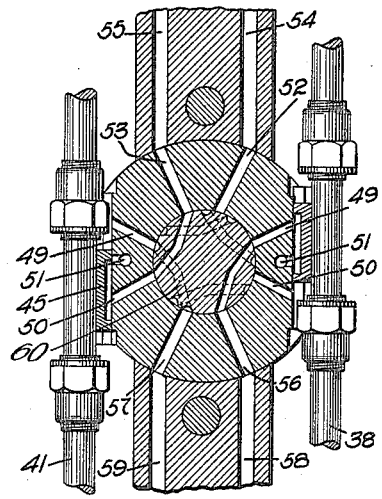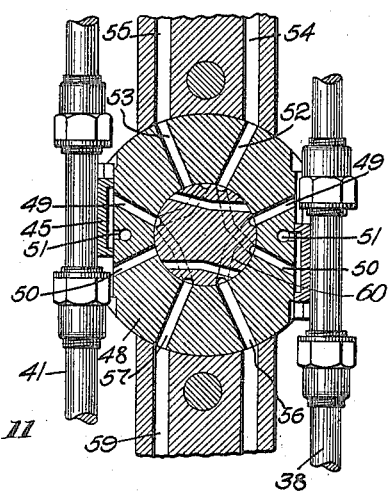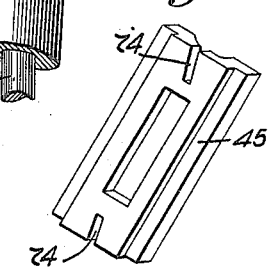

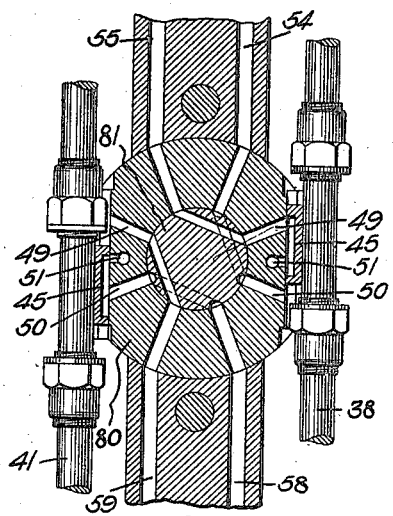
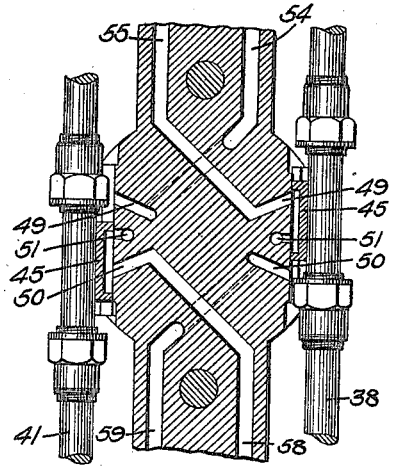
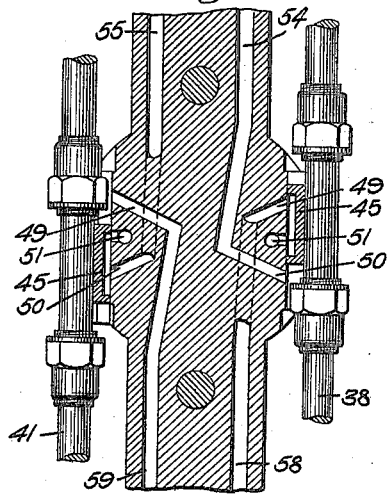
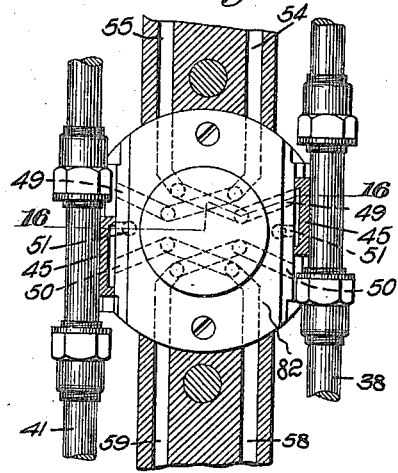
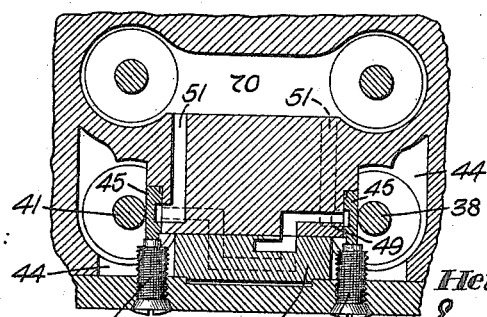

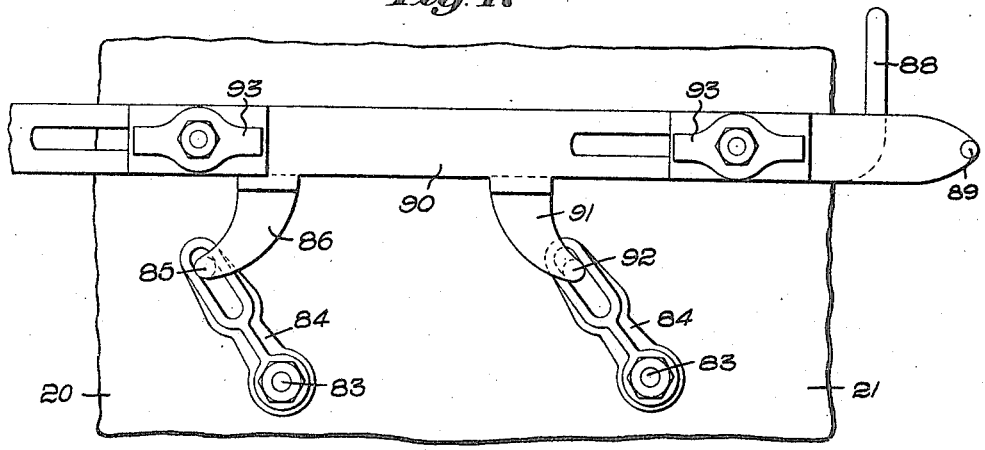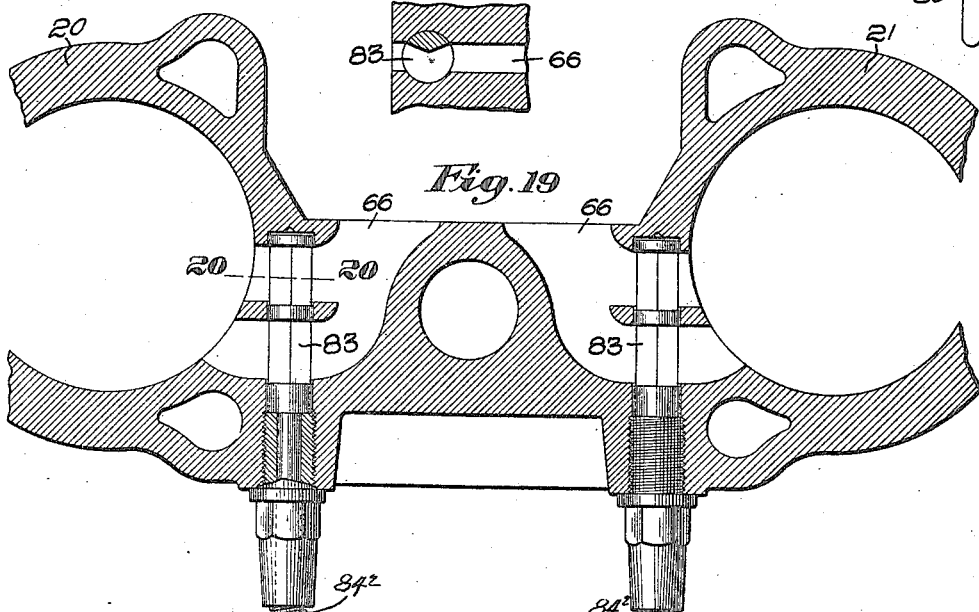

UNITED STATES PATENT OFFICE.

HENRY H. MERCER, OF CLAREMONT, NEW HAMPSHIRE, ASSIGNOR, BY MESNE ASSIGNMENTS, TO SULLIVAN MACHINERY COMPANY, OF BOSTON, MASSACHUSETTS, A CORPORATION OF MASSACHUSETTS.

ENGINE.

1,188,142.     Specification of Letters Patent.     Patented June 20, 1916.

Original application filed August 22, 1907, Serial No. 389,599. Divided and this application filed June 22, 1910. Serial No. 568,268.

*To all whom it may concern:*

Be it known that I, HENRY H. MERCER, a citizen of the United States, and a resident of Claremont, county of Sullivan, and State of New Hampshire, (whose post-office address is Claremont, New Hampshire,) have invented an Improvement in Engines, of which the following description, in connection with the accompanying drawings, is a specification, like letters on the drawings representing like parts.

This invention relates to direct-acting engines, being more particularly, though not exclusively, intended for the improvement in direct-acting engines of the general type employed in connection with stone working or quarrying machines. for example, channeling machines or the like, although my invention may have application for engines employed for widely different purposes.

This application is a division of my prior co-pending application, Serial No. 389,599, filed August 22, 1907.

My invention, as herein illustrated, is shown embodied in a track channeling machine employing two channeling units each with an independent gang of channeling tools arranged closely adjacent side by side at the edge of the truck, so that the channeler may be employed to cut a groove through the simultaneous action of two separate tool gangs, thereby greatly increasing the working capacity of the machine. In the machine constructed as disclosed, while the two gangs of tools are arranged closely adjacent each other, they are necessarily separated by a slight distance. As the machine is traversed to one end of the cut there will, therefore, be left a short portion of the cut over which one gang only has passed. To cut this portion down to its proper level it is necessary to traverse the machine back and forth once or twice, a distance equal to or possibly a little greater than the distance between the centers of the gangs. While this operation is taking place and the forward gang cutting, the remaining gang should not strike the rock. It therefore becomes desirable at times to operate both gangs simultaneously, and at other times to operate one or the other alone, while the remaining one is idle or inoperative.

One object of this invention is to provide such a system of control for an engine of this type that this may be attained efficiently and economically, such control in the illustrated embodiment of my invention being comprehended in a novel arrangement of valves, which, in themselves and apart from their application herein, have features of general advantage, novelty and application.

My invention will be best understood by reference to the following description when taken in connection with the accompanying illustration of one specific embodiment thereof, while its scope will be more particularly pointed out in the appended claims.

Figure 3:
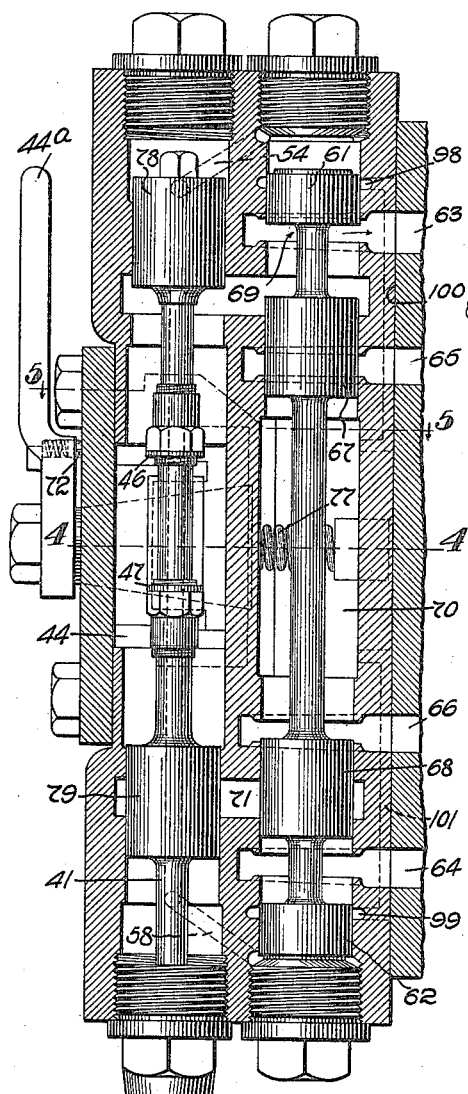
Figure 4:
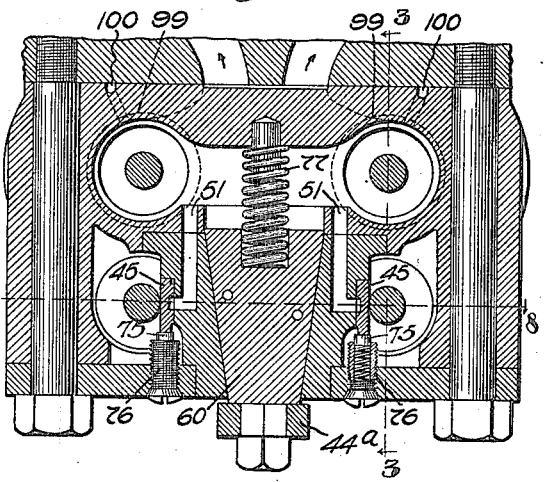
Figure 5:
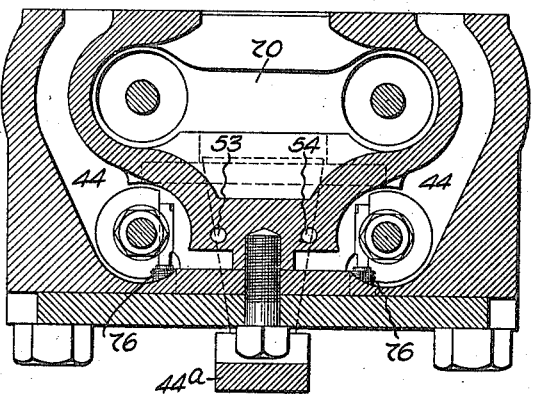
Figure 6:
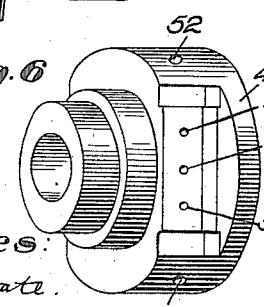
Figure 7:
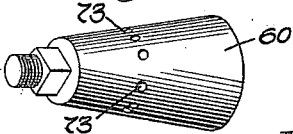

In the drawings: Figure 1 is a front elevation of a channeling machine embodying one form of my invention; Fig. 2 is an end elevation of the channeling machine shown in Fig. 1; Fig. 3 is a sectional elevation taken transversely on the line 3—3 in Fig. 4, partially broken away, showing in detail and on a large scale the arrangement of the valves; Fig. 4 is an enlarged section in plan partially broken away taken on the line 4—4 of Fig. 3; Fig. 5 is an enlarged similar section taken on line 5—5 in Fig. 3; Fig. 6 is a detail in perspective showing the block for the main controlling valve; Fig. 7 is a similar view showing the main controlling valve; Fig. 8 is a sectional elevation on the line 8—8 in Fig. 4, and in a plane taken through the reversing valves; Fig. 9 is a sectional detail view showing the main controlling valve in a different position from Fig. 8; Fig. 10 is a similar view showing the valve in still a different position; Fig. 11 shows an enlarged view of the reversing slide valve in perspective; Fig. 12 shows a modified construction of controlling valve and valve block; Fig. 13 shows a modified construction omitting the main controlling valve; Fig. 14 shows a second modification omitting the controlling valve; Fig. 15 is a section in elevation showing still a third modification; Fig. 16 is an enlarged section in plan taken on the line 16—16 in Fig. 15; Fig. 17 is a detail showing in elevation the arrangement of controlling levers for the cushioning valves; Fig. 18 is a similar view showing the same in plan; Fig. 19 is a detail sectional plan showing the position of the cushioning valves for the lower cylinder exhaust passages; Fig. 20 is a section on the line 20—20 in Fig. 19; Fig. 21 is a view similar to Fig. 9 showing a modified construction of the controlling valve; and Fig. 22 is a section on the line 22—22 in Fig. 21.

Referring to Figs. 1 and 2, while my invention may be applied to other purposes and other machines, I have there shown the same embodied in a track channeling machine having a main truck or frame 1 provided with the wheels 2, the latter adapted to move upon the rails 3 customarily laid upon the bottom of the quarry. The truck carries a truck driving motor or engine 4 and usually a boiler (the latter not shown), the engine crank-shaft 5 being connected through the reversing gearing 6, clutch shaft 12, spur gear 7, worm shaft 8 and worm gears 9 with the truck axles 10, whereby the truck may be driven under its own power. The clutch lever 11 is constructed and connected to clutch the shaft 12 to one or the other of the two oppositely driven bevel gears of the reversing gearing 6 to effect movement of the truck in either direction. Such gearing may be of any suitable or usual construction, and is unnecessary to describe in further detail, the same herein being of the general principle disclosed in U. S. patent to Ball No. 392,398. While the channeling units may be carried on the truck in any suitable manner there is here shown supported at the working side of the truck, the supporting plate 13 serving adjustably to carry the upright standard 14. The plate is mounted for a limited angular adjustment away from the vertical plane, being provided at either end with a longitudinal depending supporting member 15, which is fulcrumed in a groove in the truck frame, in which it is held down by means of the bolts 16 and clamps 17. The clamp may be loosened and the plate tipped back for angle cutting through the adjustment of the stay or brace rods 18. The front face of the supporting plate is provided with horizontal T slots 19, to which the standard 14 may be bolted, being adjustable to either end of the truck or any other intermediate position.

Referring now to the channeling units, the latter are two in number, although more may be employed if desired. While other forms of motive devices for reciprocating the channeling tools may be employed, I have herein shown ordinary and usual constructions of pressure fluid engine having their cylinders 20, 21, together with the cross-head guides 22, 23, which act to guide the tool-carrying cross-heads 24, 25, all mounted upon and carried by a vertically adjustable frame 26. The latter is gibbed to slide upon longitudinal finished ways 27 upon the standard, and the cylinder casting has its upper end secured to the lower end of the feed adjusting screw 28, so that the latter may act to advance or retract the frame together with the cylinders, and thereby adjust the gangs 29 and 30 of the channeling tools toward or away from the work.

Any suitable means for feeding the tools in the manner set forth may be employed, but herein I have provided a threaded nut with the beveled gear 31 held against longitudinal movement by the standard 14. The nut and gear are turned by the sprocket wheel 32, the latter being driven through the chain 33 and the engine 4, so that the latter is available to feed the tool toward or from the work, a controlling lever 34 being employed to start, stop or reverse the tool feed.

Power in the form of steam or other pressure fluid may be supplied for the engine, either from a boiler, which may be carried upon the truck, or from any other suitable source, from which it is led to the pressure chest of the engines by connections not shown.

The controlling valves for the two channeling units are so arranged that the latter may be operated together in opposed step or independently of each other, or power in the form of pressure fluid may be supplied to operate the one while being withheld from the other. In order that the two sets of tools may be ordinarily worked together out of unison and preferably in opposed step, I have herein shown the reversing valve of one engine controlled by the reciprocatory movement of the other, so that as one gang moves up the other one will move down, and vice versa.

While the controlling valves may have any desired type of construction, I have herein provided a main pressure actuated valve of the piston type for each cylinder and a separate reversing valve for controlling each piston valve, there being also provided additional main controlling valve means by which the relation between the reversing valves and their pressure actuated piston valves may be altered at will.

The valves (Fig. 1) are disposed in a valve chamber 37 between the two cylinders 20, 21. The right-hand (looking toward the machine, Fig. 1) reversing valve has its stem 38 connected through an adjustable threaded connection 38' to the lever 39, which latter has one end pivoted to the frame 26 and its opposite end connected by the link 40 to the right-hand cross-head 24. Likewise the stem 41 of the left-hand reversing valve is connected through an adjustable threaded connection 41' and the lever 42 and the link 43 to the left-hand cross-head 25. By this means the downward movement of the right-hand cross-head causes downward movement of the right-hand reversing valve, and likewise the downward movement of the left-hand cross-head causes downward movement of the left-hand reversing valve.

During the normal operation of the machine the main controlling or distributing valve, the handle for which is shown in Fig. 1 at 44ª, is set so that the right-hand reversing valve acts to reverse the left-hand engine, and the left-hand reversing valve acts to reverse the right-hand engine, so that a reversal of one engine from a downward to an upward movement takes place near the center of the downward movement of the cross-head of the other.

Referring to Figs. 3-8, the arrangement of valves by which the foregoing operation is accomplished will be clear and it will be necessary to refer in detail to one set of valves only, since the construction and operation of the other set is substantially the same. Live steam or other pressure fluid may be admitted through a suitable pipe (not shown) to the pressure chamber 44 (Figs. 3 and 5) through which the stem of each reversing valve passes and thence is admitted to each pressure-actuated piston valve chamber under the control of the reversing valves 45, herein, of the slide valve form and shown in detail at Fig. 11. Each reversing valve 45 works between upper and lower abutments 46, 47, upon the reversing valve stem, being preferably though not necessarily engaged by the latter with a certain amount of lost motion, so as to be moved up or down by the cross-head when the piston thereof is at or near the center of its stroke in either direction, the reversing valve constantly engaging its seat upon the valve block 48 (Figs. 6 and 8). As shown, each of these abutments is also made adjustable to permit varying the dwell of its reversing valve, the abutments being independently adjustable on threaded portions 46', 47', provided on the stems 38, 41, and also being provided with adjusting nuts 46², 47², (Fig. 8). Obviously, by varying the dwell of the reversing valve through this adjustment or by varying the length of the stems 38, 41, by means of the threaded connections 38', 41', (Fig. 1), or by the use of both of these adjustments, the action of the reversing valves may be regulated within a wide range and the blows delivered by the tools correspondingly controlled.

The valve block is provided at each side with valve-controlled passages comprising an upper radial passage 49, a lower radial passage 50 and an intermediate passage 51, the latter (Fig. 4) connected with the exhaust. The valve block is also provided at the top and bottom with a pair of upper and lower radial passages. The two upper passages 52, 53, connect, respectively, with passages 54, 55, in the valve casing leading to the upper ends (Figs. 3 and 8) of the chambers for the main or controlling valves, while the lower radial passages 56, 57 are connected, respectively, with passages 58, 59 leading to the lower ends of said main valve chambers. Centrally arranged within the valve block is the tapered controlling or distributing valve 60 provided with a plurality of transverse passages adapted to register with the radial passages in the valve block and having attached thereto the exterior handle 44ª, by which the distributing valve may be turned to make various connections between the lateral admission and exhaust passages of the valve block and the top and bottom passages leading to the controlling valves.

Referring to Fig. 3 which shows the right-hand pressure-actuated main valve—the latter is provided at opposite ends with spools 61 and 62 working in chambers to which the upper and lower pressure passages 54 and 58 lead, so that when the lower passage is connected with the exhaust and the upper passage with the admission, the valve is caused to descend to the position shown in Fig. 3. When the connections are reversed the valve rises to a reverse position. The upper admission passage for the right-hand cylinder is represented at 63 in Fig. 3, the lower admission passage for the tool end of the cylinder is represented at 64, the upper exhaust passage at 65 and the lower exhaust passage at 66. The controlling valve is also provided with upper and lower spools 67, 68, which control the upper and lower exhaust passages referred to, and in the depressed position of the valve, as represented in Fig. 3, serve to admit pressure from the pressure port 69 of the main valve to the upper admission passage 63 and connect the lower exhaust passage with the central exhaust space 70 of the main valve, which space is permanently connected with the exhaust of the engine. When the valve is lifted it will be obvious that pressure is admitted from the lower pressure port 71 of the main valve to the lower admission passage 64 and pressure is exhausted from the upper end of the cylinder through the passage 65, this resulting in the subsequent reversal of the piston movement. The handle 44ª is provided with a spring-pressed pin 72 adapted to engage with holes or notches in the face of the valve casing and may be set in any one of a plurality of positions to give various connections to the main valve passages. In Fig. 8 the plug valve 60 is represented so placed as to cause the left-hand reversing valve to control the right-hand main valve and to keep the two engines and tool-gangs out of unison. The plug valve 60 is shown as provided with several transverse passages 73, herein six in number and arranged in three sets or pairs placed in nonconflicting planes but adapted to connect the radial passages of the valve block. In Fig. 8 the position of the plug is such that the downward radial passage 56 is connected with the lateral radial passage 50, and the upper passage 52 is connected with the lateral radial passage 49, so that during the downward movement of the reversing valve 45 the pressure is exhausted from beneath the end of the right-hand main valve, and admitted to the top end of the right-hand main valve, thereby to depress the same. The passages leading to the left-hand main valve are controlled in a similar fashion by the right-hand reversing valve. The reversing-valve 45 is provided at each end with a slit 74 which registers with the mouth of the lateral radial passage in the valve block, so that a very quick admission is effected to those passages acting quickly to reverse the main valve soon after the reversing valve starts to move. As is represented in Figs. 3 and 8, the left-hand piston is down and the right-hand piston up, the former having moved its reversing valve down to depress the right-hand main valve so as to reverse the movement of the right-hand piston, which latter has raised its reversing valve sufficiently to lift the left-hand main valve and reverse the movement of the left-hand piston. By this means it will be seen that so long as the plug of the distributing valve remains in the position indicated in Fig. 8, the two engines will be run out of unison, and as shown in the drawings synchronously in opposed step, the movement of one in one direction being dependent upon the movement of the other in the opposite direction.

In order to give frictional resistance to the movement of the reversing valves 45 and permit the lost motion referred to, the valves (Fig. 4) are held laterally against adjacent guiding faces on the block by means of spring-pressed pins 75, carried in the end of the screws 76 threaded into the face of the valve casing. The distributing valve 60 is held to its tapered seat (Fig. 4) by means of a spiral spring 77 in the exhaust casing 70. By turning the distributing valve handle 44ª to the left, as viewed in Fig. 1, the right-hand engine may be rendered inoperative and the left-hand reversing valve connected to directly and independently control the left-hand engine, which, therefore, works under full power and at full speed. Such a position of the distributing valve is represented in Fig. 9, where it will be seen the upper lateral radial left-hand passage 49 of the valve block is connected to the downward left-hand radial passage 57, and the lower lateral radial left-hand passage 50 is connected to the upper radial left-hand passage 53. This places the left-hand main valve and left-hand cylinder under the control of the left-hand reversing valve. At some time after the piston starts on its down stroke it causes admission of pressure to the top of its main valve and exhausts from the bottom, this acting to admit pressure below the piston and exhaust from above, thus serving to reverse itself. Under these conditions it runs independently of the right-hand piston and at the highest speed obtainable from the supplied pressure. Turning to the pressure passages controlled by the right-hand reversing valve as shown in Fig. 9, it will be observed that the lower right-hand lateral radial passage 50 of the valve block is closed by the distributing valve, while the upper passage 49 is connected to the lower right-hand-radial passage 56. It will also be observed that the upper radial passage 52 is also closed by the valve block thereby preventing access of pressure to the top of the right-hand main valve. Under the conditions represented at Fig. 9, the absence of pressure at the top of the right-hand main valve causes the latter to remain uplifted (except as it may tend to gravitate downwardly) thereby permanently connecting the upper exhaust passage 65 of the cylinder with the exhaust space 70, tending to lift the right-hand piston up and the right-hand tool gang out of the cut, so long as the conditions represented in Fig. 9 last.

It will be observed that each valve stem 38 and 41 is provided with upper and lower spools 78 and 79, which act as cut off valves and alternately open and close the pressure ports 69 and 71 of the main valves, pressure being admitted to the port 69 only when the cut off valve is up, and to the port 71 only when the cut off valve is down, (see Fig. 8). The cut off spools therefore cut off pressure to the cylinder before the main valve acts and thereby serve to give a sharp cut off and more economical consumption of the steam or other pressure fluid employed. Under the conditions described with reference to Fig. 9, while pressure is normally cut off from the lower pressure port 71 of the right-hand main valve, the same is instantly admitted thereto and therefore to the lower admission passage 64 if the right-hand piston drops below a certain point.

With the distributing valve in the position shown in Fig. 9 the right-hand piston at first lifts to the top of its cylinder, and the elevation of the cut off valve spool 79 immediately cuts off admission from the bottom of the cylinder. Condensation or leakage will gradually permit the weight of the tool gang to draw the piston down. As soon, however as the spool 79 of the reversing valve opens the port 71 to the pressure space 44 a small amount of steam will instantly be admitted below the piston and cause the latter again to lift. This condition permits the left-hand piston to be run at full speed while the other comes well up to the top of its cylinder and moves slightly and slowly up and down enough to free the cylinder of water from the line of piping or from condensation. By this means all effective power is withheld from the right-hand cylinder, resulting in a great economy of steam. This feature has an additional advantage in working in mud seams in soft stone. If the forward tool gang should strike a seam, it is thrown out of operation, but unless it moves slowly it may not enter the groove on the other side of the mud seam when it comes to it, if the groove is not exactly in line. If, however, the leading gang is caused to work up and down slowly while withheld from effective operation, this is avoided. In the larger types of machine, the leakage above referred to is assisted by the use of a leakage hole in connection with the cushion valve to control leakage as hereinafter described. If the main valve becomes worn so that it descends by gravity before the piston descends, substantially the same result follows since the main valve is raised by pressure as soon as the piston and reversing valve descends far enough. If the distributing valve is moved clockwise from the position shown in Fig. 8 it assumes a position represented in Fig. 10, where power is withheld from the left-hand engine and the latter rendered inoperative, while the right-hand engine continues to run under full power. The connections of the various ports and passages being substantially the same as in Fig. 9, though in reverse relation with reference to the two cylinders, no further explanation will be necessary with reference to Fig. 10, it being understood that the same action takes place with reference to the right-hand cylinder and the left-hand cylinder as has been described with reference to the left-hand cylinder and right-hand cylinder, respectively, in connection with Fig. 9. If the distributing valve is turned either farther to the right of the position shown in Fig. 10, or farther to the left of the position shown in Fig. 9, it will assume a position wherein it serves to connect the controlled pressure passages of the left-hand reversing valve with the left-hand main valve, and the controlled pressure passages of the right-hand reversing valve with the right-hand main valve. The two engines are then run independently of each other, each under the full head of pressure. Such position of the distributing valve is not illustrated, but the relation of the passages will be readily comprehended from Fig. 14 where I have shown precisely the same passage connections but with the passages permanently formed in the walls of the casing and without the employment of an adjustable distributing valve. In the construction of Fig. 14 the two engines are run independently and constantly, while pressure is supplied thereto except as one or the other may be rendered inoperative for cutting purposes by use of the cushioning valve, to be described.

In Fig. 13 I have shown a modified construction wherein no distributing valve is employed, the pressure passages being permanently formed within the walls of the valve casing and so arranged that the same condition permanently exists as is effected by moving the distributing valve to the position shown in Fig. 8, that is to say, the engines are permanently connected to work in opposed step.

In Fig. 12 I have shown a modified construction of valve block 80 and distributing valve 81, passages therefor being so disposed that in the position shown in Fig. 12 the pressure passages leading to the upper ends of the two main valves are controlled by one reversing valve, while the pressure passages leading to the lower ends of the said main valves are controlled by the other reversing valve. The effect of this is to admit pressure to the top of one main valve and to simultaneously exhaust the same from the top of the other by movement of one reversing valve, while pressure is simultaneously exhausted from the bottom of the first main valve and admitted to the bottom of the second main valve by a simultaneous reverse movement of the other reversing valve. This secures in another way the synchronous cutting action of the two engines out of unison and in alternation. The distributing valve in Fig. 12 may also be moved to a position (not shown) to provide for the independent operation of the two engines under conditions resembling those shown in Fig. 14.

In Figs. 15 and 16 I have shown a modified construction of the form represented in Fig. 13, where the engines are permanently connected to run in opposed step, the principal difference being that the connections between the pressure passages leading to the ends of the main valves and the pressure passages controlled by the reverse valve are formed in a face plate 82 fastened to the walls of the valve chamber. The use of such face plate imposes an out-of-step operation upon the engines, so long as it is employed. If, however, it is desired to operate the engines singly or independently, the face plate 82 may be removed and another one substituted therefor having the necessary connecting passages to provide the connections shown in Fig. 14. Obviously the particular construction of distributing valve is a matter of minor importance and this invention comprehends any suitable device for accomplishing this purpose. The valve, of course, may take numerous other forms within the spirit and scope of the appended claims, as will be obvious to those skilled in the art.

From the construction described, it will be evident that a channeling machine provided with channeling units equipped as disclosed, may be traversed with both units in simultaneous operation, thereby obtaining greatly increased working output as compared with channeling machines of the usual construction. When the machine reaches the right-hand end of the cut the distributing valve may be turned to throw the left-hand engine out of operation and the machine reversed to cause it to travel back a distance equal to the distance between the centers of the tool gangs, when it is again reversed and caused to travel again to the extreme end of the cut. The feed can then again be reversed and the distributing valve handle moved to start both engines in operation, which condition may hold until the machine reaches the left-hand end of the cut on its return travel, whereupon the right-hand cylinder and gang may be rendered inoperative and the machine worked with reference to the left-hand end of the cut, as has been described with reference to the right-hand end thereof.

Means are provided for cushioning or throttling the exhaust in the lower end of either cylinder, so that the force of the blow struck by the tool gang may be varied or the blow caused to fall short of the work. This is ordinarily useful in regulating the blow of the tool, although, if desired, the exhaust cushioning device may be used to render one or the other, or both tool gangs temporarily inoperative, such use, however, being not so economical or convenient as the employment of the distributing valve described.

In the drawings I have disclosed means for operating the exhaust throttle valve for each cylinder either separately or together. Referring to Figs. 17 and 19, and particularly to the cross-sectional plan of the cylinders shown in Fig. 19, the exhaust passage 66 will be seen to branch just before entering the cylinder and in the two branches there is placed transversely a throttle valve 83 comprising a cylindrical member partly cut away at the point where it traverses the exhaust passage and so shaped that by turning the same the available cross-sectional area of the exhaust passages may be varied, and more or less of the exhaust pressure fluid thereby trapped in the bottom of the cylinder to check the force of the downward piston blow. The valves 83 pass to the outside and back of the cylinder where they are each connected to a slotted arm 84, the latter being normally pressed against a bolt head or other stop 84' carried on the valve, by a spring 84², (Fig. 19). The slot in the arm 84 for the cylinder 20 is engaged by a pin 85 carried by the depending finger 86 on the inner one of a pair of horizontal slide rods, the inside rod 87 having an upwardly and outwardly turned handle 88 by which it may be moved and the exhaust for the cylinder 20 thereby throttled. The exhaust throttle valve for the cylinder 20 is likewise controlled by the outwardly inclined horizontal handle 89 secured to the outer one 90 of the two slide rods the latter carrying a depending finger 91 provided with pin 92 engaging the arm 84 of the throttle valve.

Spring clips 93 offer frictional resistance to the accidental displacement of the slide rods and the controlling handles 88, 89, of the latter are so arranged that they may be grasped together and the throttle valves turned simultaneously or one or the other grasped or moved to the exclusion of the remaining one. The opposite ends (not shown) of the controlling rods are preferably provided with duplicate handles 88 and 89, so that the piston blow may be cushioned by an attendant standing at either side of the standard.

In order to regulate somewhat the movement of the ineffective piston when effective power is withheld therefrom, as by the movement of the distributing valve in one direction or the other, and also to cushion the up movement of the main valve and the piston, it may sometimes be advisable to admit a throttled or regulated amount of pressure to the top of the main valve instead of cutting off that side of the main valve entirely from the pressure, as represented in Figs. 9 and 10. This may be done in any suitable way, but in Figs. 21 and 22 there is shown by way of illustration a distributing valve similar to that shown in Figs. 8 to 10 but having an extra pair of passages 94 and 95 provided with throttling screws 96 and 97, which may be adjusted from the outside by taking off the valve handle 44ᵃ. These passages are brought into service only when the valve handle is turned to the right or to the left for throwing out the left or right hand cylinder respectively. When thrown to the left or to the position corresponding to that in Fig. 9, pressure is admitted to the bottom of the main valve through the lower radial passage 56 as before, and pressure is also admitted to the top of the controlling valve through the upper radial passage 52 to an extent which may be delicately regulated by the throttling screw 96. Under these conditions a small amount of pressure is repeatedly admitted to the top of the main valve and to the top of the piston so that these parts are cushioned on their upward movement. Such device also serves to regulate the rapidity and force of the piston movement when it is withheld from effective action as described.

As the main valves become worn, pressure tends to leak past the spools 61 or 62 from the pressure ports 69 or 71 respectively and passing to the ends of the spool interfere with the best operation of the valves. There are provided annular grooves 98 and 99 covered by the valve spools 61 and 62, which grooves connect respectively with passages 100 and 101 leading to the exhaust (see Fig. 3). This permits the transference of pressure fluid which leaks past the inner edges of the spool to the exhaust and thereby prevents its interference with the normal working of the valve.

While preferably is shown the two channeling units normally operated in opposed step, so that they tend to balance each other, it is not essential to my invention that they be operated exactly in this relation, although it is desirable that they be in some measure out of unison, in order that the blow of one unit may not take place at the same time with the blow of the other unit, and thereby require the machine to withstand a double shock.

Where channeling units are employed using an engine construction similar to that described, the particular point in the stroke at which reversal takes place is immaterial so far as my invention is concerned, provided the reversing valves are actuated at or near the centers of the piston strokes, it being more properly a matter of engine design or adjustment to suit particular conditions. Obviously, in the construction shown the point in the cycle of movement at which reversal takes place may be varied by eliminating or varying the amount of lost motion which takes place between the reversing valve and its stem or by varying the length of the slots 74 in the reversing valve.

While I have herein shown and described one form of my invention, it is to be understood that the same is not limited to the details of construction or to the form or relative arrangement of parts, but that extensive modifications may be made in constructional details, as well as the application herein made of the invention, without departing from the spirit thereof.

Claims:

1. The combination with a pair of direct acting engines of a pressure-actuated controlling valve for each engine, a reversing valve for each engine connected to be moved by piston movement thereof, said reversing valves controlling the moving pressure for said controlling valves, and means for varying the passage connections between said reversing valves and said controlling valves.

2. The combination with a pair of direct acting engines of a pressure actuated controlling valve for each engine, a pair of reversing valves one connected to be moved by the reciprocatory movement of one piston, and the other by the reciprocatory movement of the other piston, said reversing valves controlling the moving pressure for said controlling valves, and a valve having one position permitting the engines to run independently of each other, and a second position causing them to run in synchronism.

3. The combination with a pair of direct acting engines of a pressure actuated controlling valve for each engine, a pair of reversing valves, one connected to be moved by the reciprocatory movement of one piston, and the other by the reciprocatory movement of the other piston, said reversing valves controlling the moving pressure for said controlling valves, and a valve having one position permitting simultaneous operation of both engines, and a second position causing the effective operation of one engine only.

4. The combination with a pair of direct acting engines of a pressure actuated controlling valve for each engine, a pair of reversing valves, one connected to be moved by the reciprocatory movement of one piston, and the other by the reciprocatory movement of the other piston, said reversing valves controlling the moving pressure for said controlling valves, and a valve adapted to connect the reversing valve of one cylinder for the exclusive control of the controlling valve of one cylinder, and the reversing valve of the other cylinder for the exclusive control of the other cylinder, or to connect the reversing valve of one cylinder for the controlling valve of the other cylinder, and the reversing valve of the other cylinder for the control of the controlling valve of the first cylinder.

5. The combination with a pair of vertical direct acting engines of valve controlling means therefor permitting either the simultaneous operation of said engines, or the operation of one engine while the piston for the remaining engine is lifted to the top of the cylinder.

6. In a direct acting engine, the combination with a pair of cylinders, each with its piston and pressure-actuated controlling valve, of a pair of reversing valves for reversing the said controlling valves, the reversing valve for each piston being controlled by the other piston, and means for changing the passage connections between the reversing valves and the controlling valves.

7. A direct acting engine having a cylinder with its piston and provided with a main pressure actuated valve of the piston type, said valve having a pair of spools, a reversing valve for said piston valve and pressure ducts connected with the exhaust and constantly covered by said spools.

8. A direct acting engine having a cylinder with its piston and provided with a main pressure actuated valve of the piston type, said valve having a pair of spools, a reversing valve for said piston valve, a cut-off valve, operative connections between said valves and said piston, pressure passages controlled by said reversing and cut-off valves and communicating with the spools of said main pressure actuated valve, and pressure ducts connected with the exhaust and constantly covered by said spools.

9. A direct acting engine having a pair of cylinders each with its piston and pressure actuated controlling valve, a pair of reversing valves for reversing the said controlling valves, and means for throttling the pressure admitted to one end of a controlling valve.

10. The combination with a pair of direct acting engines provided each with its cylinder and piston of means for operating said engines in an out-of-step relation and provided with a valve for regulating the amount of exhaust trapped in the bottom of each cylinder.

11. The combination with a pair of direct acting engines, each provided with its cylinder and piston, of an exhaust throttle valve for each cylinder and throttling exhaust means for simultaneously moving the two exhaust throttle valves.

12. The combination with a pair of direct acting engines each provided with its cylinder and piston, of an exhaust throttle valve for each cylinder, and exhaust throttle controlling means for simultaneously moving the two exhaust throttle valves or moving one independently of the other.

13. The combination with a pair of direct acting engines each provided with its cylinder and piston, of an exhaust throttle valve for each cylinder, and exhaust throttle controlling means located at one side of said engines for simultaneously moving the two exhaust throttle valves or moving one independently of the other.

14. The combination with a pair of direct acting engines each provided with its cylinder and piston, of an exhaust throttle valve for each cylinder, and exhaust throttle controlling means located at each side of said engines for simultaneously moving the two exhaust throttle valves or moving one independently of the other.

15. The combination with a pair of direct acting engines, of a pressure actuated controlling valve for each engine, a pair of reversing valves, means for moving said reversing valves to cause the engines to work in opposed steps, and means for controlling the passage connections leading to the valves to operate either engine singly.

16. The combination with a pair of direct acting engines, of a pressure actuated controlling valve for each engine, a pair of reversing valves, pressure passages for controlling said pressure actuated valves from said reversing valves, and means for controlling said passages.

17. The combination with a pair of direct acting engines of a pressure actuated controlling valve for each engine, a reversing valve for each engine connected to be moved by piston movement thereof, said reversing valves controlling the moving pressure for said controlling valves, and a single valve provided with passages for conjointly varying the passage connections between said reversing valves and said controlling valves.

18. In a direct acting engine the combination with a pair of cylinders, each with its piston and pressure actuated controlling valve, of a pair of reversing valves for reversing said controlling valves, a valve for changing the passage connections between the reversing valves and the controlling valves, and means carried by the last mentioned valve for throttling the pressure admitted to one end of a controlling valve.

19. In a duplex engine, the combination with a pair of pressure fluid engine units each having a cylinder and a piston working therein, of controlling means for applying pressure fluid to said units simultaneously or to one of said units alone, and operative connections between said controlling means and said channeling units, whereby said controlling means, when effecting the operation of one of said units, only serves to withdraw the piston of the remaining unit toward one end of its stroke.

20. In a duplex engine, the combination with a pair of pressure fluid engine units each having a cylinder and a piston working therein, of controlling means having passages to apply pressure fluid to one of said units alone for the continued operation thereof while at the same time applying continued pressure fluid to withdraw the piston of the remaining unit toward one end of its stroke.

21. In a duplex engine, the combination with a pair of cylinders, each with its co-operating piston, a controlling device serving to admit pressure fluid alternately to the opposite ends of both cylinders, and passages controlled thereby, said controlling device having passages for admitting pressure fluid alternately to the opposite sides of one cylinder and constantly to one end of the remaining cylinder.

22. In a stone working machine, the combination with a pair of cutting units, of pressure fluid operating means therefor, and controlling means having passages to apply effective pressure to one of said units alone for the continued operation thereof while at the same time applying continued pressure fluid in pulsations in opposite directions to withdraw the remaining cutting unit from the work.

23. A pressure fluid direct-acting impact engine comprising, in combination, a cylinder, a piston working therein; a pressure fluid operation controlling valve therefor; a reversing valve controlling the pressure-fluid for operating said controlling valve; and valve-operating means connecting said piston to said valve and providing for a limited free play therebetween.

24. In a direct acting engine, the combination with a cylinder and its piston and pressure actuated controlling valve, of a reversing valve for reversing the said controlling valve, a cut-off valve, means connected between said cut-off valve and said piston, and adjustable means movable with said cut-off valve and engageable with said reversing valve for reversing said valve when said piston is at or near the center of its stroke.

25. In a direct acting engine, the combination with a cylinder and its piston and pressure actuated controlling valve, of a reversing valve for reversing said controlling valve, a cut-off valve coöperating with said valves, an operative connection between said cut-off valve and said piston, and means carried by said cut-off valve and engageable with said reversing valve for varying the dwell of said reversing valve.

26. In a direct acting engine, the combination with a cylinder and its piston and pressure actuated controlling valve, of a reversing valve for reversing said controlling valve, a cut-off valve having a stem, a connection between said cut-off valve and piston, and adjustable abutments on said cut-off valve stem engageable with the opposite ends of said reversing valve.

27. In a direct acting engine, the combination with a cylinder and its piston and pressure actuated controlling valve, of a reversing valve for reversing said controlling valve, a cut-off valve coöperating with said valves, an operative connection between said cut-off valve and said piston, means carried on said cut-off valve and engageable with said reversing valve for varying the dwell of said reversing valve, and means for varying the time of operation of said cut-off valve.

In testimony whereof, I have signed my name to this specification, in the presence of two subscribing witnesses.

HENRY H. MERCER.

Witnesses.
E. J. BURCHARD,
E. S. BRYANT.

Copies of this patent may be obtained for five cents each, by addressing the "Commissioner of Patents, Washington, D. C."